United States Patent
Valentine

[15] 3,644,977
[45] Feb. 29, 1972

[54] APPARATUS FOR ALIGNING THE ENDS OF ADJOINING LENGTHS OF PIPE

[72] Inventor: L. Travis Valentine, 1303 Davon Ln., Houston, Tex. 77058

[22] Filed: Dec. 3, 1969

[21] Appl. No.: 881,839

[52] U.S. Cl. ............................29/200 P, 228/4, 228/44, 269/48.1
[51] Int. Cl. ...........................................B23p 19/00
[58] Field of Search ...................29/200 P; 228/4, 44, 49; 269/48.1, 49, 50

[56] References Cited

UNITED STATES PATENTS

| | | | |
|---|---|---|---|
| 2,830,551 | 4/1958 | Miller | 269/49 X |
| 2,754,787 | 7/1956 | Reed | 269/48.1 |
| 3,270,411 | 9/1966 | Thomas | 269/48.1 X |
| 2,615,413 | 10/1952 | Adams et al. | 29/200 P |
| 2,638,069 | 5/1953 | Mearns | 269/48.1 |

Primary Examiner—John F. Campbell
Assistant Examiner—Robert J. Craig
Attorney—Dunlap, Laney, Hessin & Dougherty

[57] ABSTRACT

The present disclosure relates to apparatus for aligning the ends of adjoining lengths of pipe so that they may be conveniently welded together, such as in the construction of pipelines and the like. A cylindrical housing having a pair of drive wheels rotatably journaled therein is movably supported inside the pipe lengths to be welded together. A plurality of elongated shaft members are pivotally attached to each of the drive wheels in spaced relation around the peripheries thereof, said shaft members each having one end extending outwardly from the sides of the housing and being slidably secured therein so that rotation of the drive wheels causes the shaft members to be moved inwardly or outwardly with respect to the housing. Means are attached to the housing for selectively rotating the drive wheels, and a shoe for contacting the inside surfaces of the pipe without causing damage thereto is attached to each of the shaft members. The apparatus of the present disclosure is positioned with the shoes inside adjoining ends of the lengths of pipe and the drive wheels are rotated so that the shoes are extended outwardly against the inside surfaces thereof, thereby securing the ends of the lengths of pipe in an aligned position.

6 Claims, 6 Drawing Figures

Patented Feb. 29, 1972
3,644,977
2 Sheets-Sheet 1
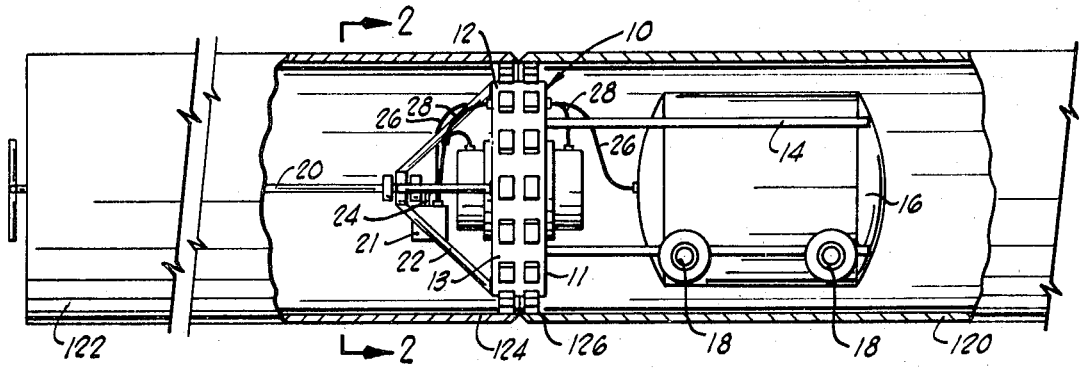
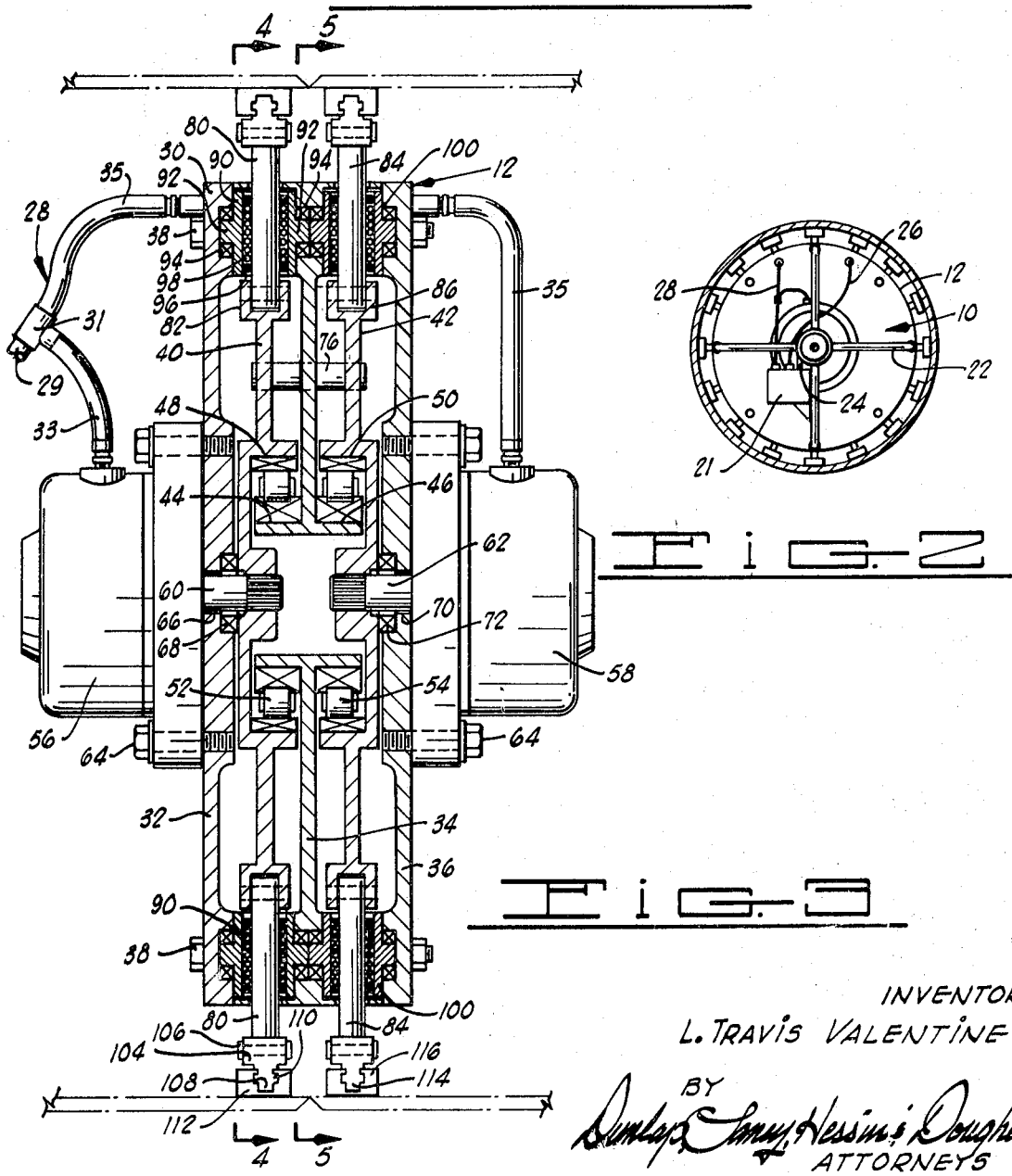
INVENTOR
L. TRAVIS VALENTINE
BY
Dunlap, Laney, Hessin & Dougherty
ATTORNEYS

INVENTOR
L. TRAVIS VALENTINE

BY
Dunlap, Laney, Hessin & Dougherty
ATTORNEYS

APPARATUS FOR ALIGNING THE ENDS OF ADJOINING LENGTHS OF PIPE

BACKGROUND OF THE INVENTION

1. Field of the Invention

The present invention relates generally to apparatus for aligning the ends of adjoining lengths of pipe, and more particularly, but not by way of limitation, to apparatus for aligning the ends of adjoining lengths of pipe whereby the apparatus is positioned inside the ends of the pipe lengths and expanded outwardly thereagainst.

2. Description of the Prior Art

Many various apparatus have been developed for aligning the ends of adjoining lengths of pipe to facilitate the welding thereof. In the construction of pipelines and the like a great number of pipe lengths are welded together end to end. When the pipe lengths are of a relatively small diameter and lightweight, adjoining ends thereof may be relatively easily manually aligned and welded. However, when the pipe lengths are of a large diameter they must be lifted using gin pole trucks or other mechanical means, and the manual alignment of the ends of adjoining lengths is difficult to achieve and time consuming.

Apparatus which attach to the outside surfaces of adjoining lengths of pipe are commonly used. However, such apparatus generally require considerable time to move along a pipe line as successive lengths are welded thereto. In addition, such apparatus do not readily lend themselves to the use of automatic welding equipment since they must be positioned on both sides and over the area to be welded.

While apparatus for aligning the ends of adjoining lengths of pipe from the inside have been developed and used heretofore, these apparatus are generally expensive, difficult to operate, and often scratch or otherwise cause damage to the inside surfaces of the ends of adjoining lengths of pipe during the alignment thereof. Also, lengths of pipe of the same nominal diameter often vary slightly in actual inside diameter due to manufacturing tolerances. In using prior apparatus for aligning pipe from the inside where one length of pipe is smaller than the other, proper alignment is difficult to achieve and the smaller pipe is often bent out of shape.

By the present invention, apparatus for internally aligning the ends of adjoining lengths of pipe without damaging the inside surfaces thereof is provided which is relatively inexpensive, easily operated and easily moved along the inside of the pipe line. Further, the present invention may be used to align the ends of lengths of pipe of differing diameters without bending or otherwise damaging the end of the smaller length of pipe.

SUMMARY OF THE INVENTION

The present invention relates to apparatus for aligning the ends of adjoining lengths of pipe comprising a closed cylindrical housing having parallel ends, a pair of circular drive wheels rotatably journaled within the housing positioned parallel to and concentrically with the ends of the housing, a plurality of elongated shaft members pivotally attached to each of the drive wheels in spaced relation around the peripheries thereof, said shaft members each having one end extending outwardly from the sides of the housing and being slidably secured therein so that rotation of the drive wheels causes the shaft members to be moved inwardly or outwardly with respect to the sides of the housing, each of the shaft members having a shoe assembly for contacting the inside surface of a length of pipe attached to the outer end thereof, means for rotating the drive wheels in predetermined directions attached to the housing, and means for movably supporting the housing within a pipe attached to the housing.

It is, therefore, a general object of the present invention to provide apparatus for aligning the ends of adjoining lengths of pipe.

A further object of the present invention is the provision of apparatus for aligning the ends of adjoining lengths of pipe whereby the apparatus is positioned on the inside of the pipe.

Yet a further object of the present invention is the provision of apparatus for internally aligning the ends of adjoining lengths of pipe which is relatively inexpensive and simple to operate and which may readily be moved along the inside of a pipeline as it is being constructed.

Still a further object of the present invention is the provision of apparatus for internally aligning the ends of adjoining lengths of pipe which will not scratch, bend or otherwise damage the pipe or internal coating thereon during the alignment thereof.

Other and further objects, features, and advantages will be apparent from the following description of presently preferred embodiments of the invention, given for the purpose of disclosure, and taken in conjunction with the accompanying drawings.

BRIEF DESCRIPTION OF THE DRAWINGS

FIG. 1 is a side elevational view, partially in section, of a pair of pipe lengths with the apparatus of the present invention positioned therein.

FIG. 2 is a cross-sectional view taken along line 2—2 of FIG. 1.

FIG. 3 is an enlarged cross-sectional illustration of a portion of the apparatus of the present invention shown in FIG. 1.

DESCRIPTION OF THE PREFERRED EMBODIMENTS

Figure 4:
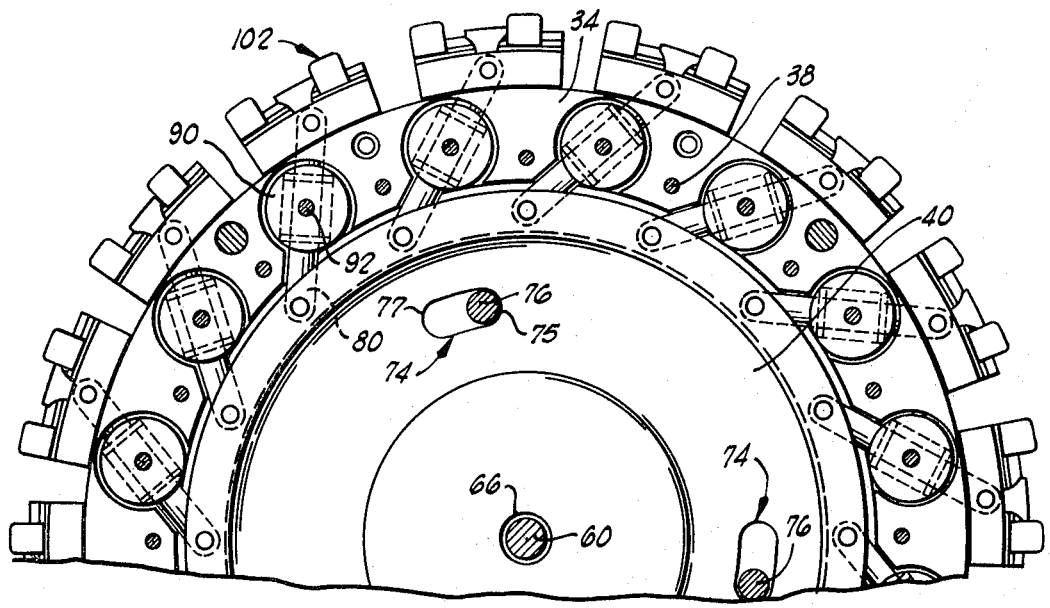
FIG. 4 is a partial sectional view of the apparatus of the present invention in the nonextended position and taken along line 4—4 of FIG. 3.

Referring particularly to FIGS. 1 and 2, the apparatus of the present invention is generally designated by the numeral 10. The apparatus 10 basically comprises a pipe alignment assembly 12, which will be described in detail hereinbelow, having a frame 14 attached to the rearward end 11 thereof. A container or tank 16 is attached to the frame 14, and a plurality of wheels 18 for movably supporting the apparatus 10 within a pipe are attached to the frame 14. An elongated operator or handle 20 is pivotally attached at the forward end 13 of the assembly 12 by a plurality of arms 22. A conventional three-way valve 21 is attached to one of the arms 22 and is operably connected to the operator 20 by a conventional linkage assembly 24. A source of compressed air contained within the tank 16 is connected to the valve 21 by a flexible hose 26, and the valve 21 is connected to the assembly 12 by a hose assembly 28.

Figure 5:
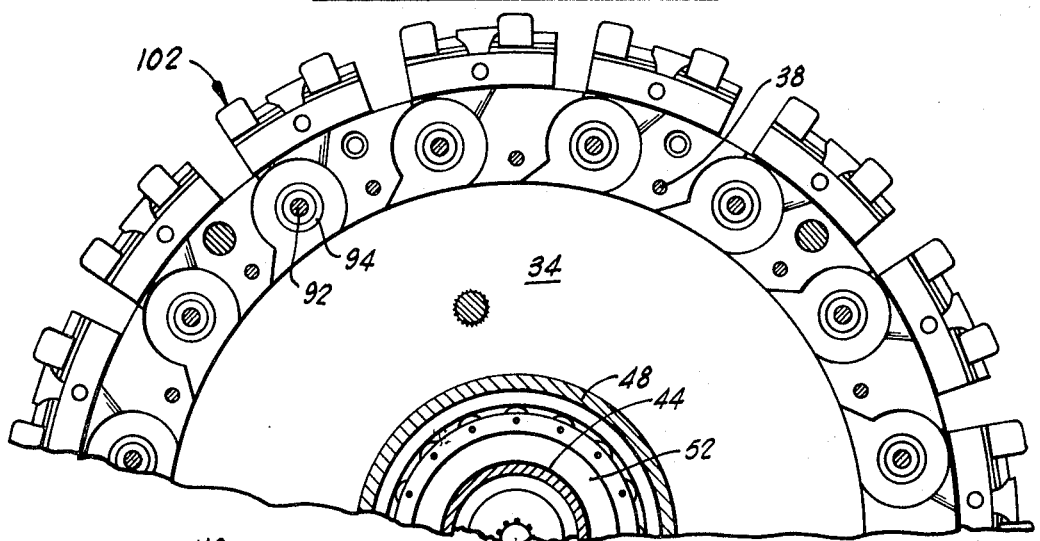
FIG. 5 is a partial sectional view of the apparatus of the present invention shown in the nonextended position taken along line 5—5 of FIG. 3.

Referring now to FIGS. 3, 4 and 5, the pipe alignment assembly 12 is illustrated in detail. The assembly 12 comprises a housing 30 consisting of a front circular cover plate 32, an intermediate housing member 34 and back circular cover plate 36. The cover plate 32, intermediate housing member 34 and cover plate 36 are bolted together by a plurality of conventional bolts 38. A pair of identical drive wheels 40 and 42 are rotatably journaled within the housing 30 with the axes thereof coinciding with the axis of the housing 30. Specifically, the intermediate housing member 34 includes a pair of oppositely extending horizontal annular shoulders 44 and 46. The annular shoulders 44 and 46 are positioned on a circle, the axis of which coincides with the axis of the housing 30. Each of the members 40 and 42 include annular shoulders 48 and 50, respectively, positioned in opposed relation to the shoulders 44 and 46 of the member 34. A conventional roller bearing 52 is disposed between the annular shoulder 48 of the drive wheel 40 and the opposing annular shoulder 44 of the intermediate housing member 34. An identical roller bearing 54 is disposed between the annular shoulder 50 of the drive wheel 42 and the opposing annular shoulder 46 of the intermediate housing member 34. Thus, the drive wheels 40 and 42 are journaled within the housing 30 by roller bearings 52 and 54 with the axes thereof coinciding with the axis of the housing 30.

A pair of oppositely faced drive motors 56 and 58 having drive shafts 60 and 62 are bolted to the cover plates 32 and 36, respectively, by a plurality of bolts 64. The drive motors 56 and 58 may be any conventional pneumatically operated drive motors which will impart a desired rotation to the drive shafts 60 and 62 thereof. The drive shaft 60 of the drive motor 56 extends through an enlarged bore 66 disposed in the cover plate 32 and is rigidly attached to the drive wheel 40. A conventional bearing 68 is positioned between the cover plate 32 and the drive wheel 40 so that the drive wheel 40 may be freely rotated within the housing 30. The shaft 62 of the drive motor 58 extends through an enlarged bore 70 disposed in the cover plate 36, and is rigidly attached to the drive wheel 42. A conventional bearing 72 is disposed between the cover plate 36 and drive wheel 42 so that the drive wheel 42 may be freely rotated.

Each of the drive wheels 40 and 42 includes three slots 74 (FIG. 4) positioned in spaced relation to each other and at an equal distance from the axis of the drive wheels 40 and 42. Three stop members 76 (FIG. 3) are attached to the intermediate housing member 34 and extend through the slots 74 in drive wheels 40 and 42. As will be understood, the slots 74 and stop members 76 serve to limit the rotational travel of the drive wheels 40 and 42 to a predetermined distance.

Figure 6:
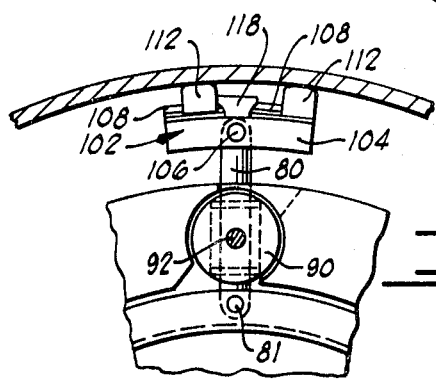
FIG. 6 is a partial sectional view of the apparatus of the present invention extended against the inside surface of a pipe length taken substantially along line 4—4 of FIG. 3.

A plurality of elongated shaft members 80, positioned in angular spaced relation about the axis of the housing 30, are pivotally attached to the peripheral end of the drive wheel 40. The shaft members 80 are positioned in a plane coinciding with the plane of the drive wheel 40, each having one end thereof pivotally attached thereto. As shown best in FIG. 1, the peripheral end 82 of the drive wheel 40 is formed in the shape of a "U" in cross section, and one end of each of the shaft members 80 is pivotally attached therein by a pin 81 (FIG. 6). A plurality of elongated shaft members 84, identical to the shaft members 80, are pivotally attached to the peripheral end 86 of the drive wheel 42 in the same manner as the shaft members 80. As will be understood, the shaft members 84 are positioned in a plane coinciding with the plane of the drive wheel 42 in angular spaced relation about the axis of the housing 30.

Each of the shaft members 80 is disposed within a member 90 which is in turn journaled between the cover plate 32 and intermediate housing member 34. Each of the members 90 is cylindrical in shape having a pair of journals 92 extending outwardly from opposite ends thereof. The journals 92 are rotatably secured between the cover plate 32 and the intermediate housing member 34 by a pair of conventional bearings 94. An enlarged bore 96, positioned perpendicular to the axis of the journals 92, is disposed in the member 90 through which the shaft member 80 extends. A conventional thrust bearing 98 is disposed between the bore 96 of the member 90 and the shaft member 80.

Referring specifically to FIG. 4, the members 90 are positioned with respect to the shaft members 80 so that when the drive wheel 40 is rotated in a counterclockwise direction, to a position where the stop members 76 contact the ends 75 of the slots 74, the shaft members 80 will be pulled inwardly through the members 90 and the members 90 will be rotated clockwise about an axis parallel to the axis of the drive wheel 40. Conversely, as the drive wheel 40 is rotated in a clockwise direction to a position where the stop members 76 contact the ends 77 of the slots 74, the shaft members 80 will be forced outwardly through the members 90 and the members 90 will rotate in a counterclockwise direction (FIG. 6).

Each of the shaft members 84 are disposed within members 100 which are identical to the members 90 described above, and which are journaled between the intermediate housing member 34 and the cover plate 36. However, the members 100 and shaft members 84 are positioned so that as the drive wheel 42 is rotated in a clockwise direction when viewed from the forward end 13 of the housing 30, the shaft members 84 are moved inwardly. As the drive wheel 42 is moved in a counterclockwise direction, the shaft members are extended outwardly in the same manner as described above for the shaft members 80. As will be understood, the slots 74 disposed in drive wheel 42 are of a length identical to the slots 74 in drive wheel 40, and the length of the slots 74 is such that the drive wheels 40 and 42 may each be rotated from positions whereby the shaft members 80 and 84 are not extended to positions whereby the shaft members 80 and 84 are fully extended.

Identical shoe assemblies, generally designated by the numeral 102, are pivotally attached to ends of the shaft members 80 and 84 extending outside of the housing 30. Referring particularly to FIGS. 3 and 6, each of the shoe assemblies 102 is comprised of a rectangular block 104 pivotally attached to a shaft member 80 or 84 by a pin 106. The outer surface of the block 104 includes a pair of upstanding flange members 108. The flange members 108 each include a pair of continuous tongue portions 110 extending outwardly on opposite sides thereof. A pair of pipe contact members 112 are slidably disposed over the flange members 108 of the block 104. Each of the contact members 112 includes a slot 114 extending therethrough having a pair of grooves 116 for mating with the tongue portions 110 of the flange members 108 disposed therein. A stop 118, which may be an integral part of the block 104 is positioned between the flange portions 108.

OPERATION

Referring particularly to FIGS. 1 and 2, the apparatus 10 is movably supported within a pipe 120. As will be understood, the pipe 120 will normally be the last length of pipe in a pipeline being constructed. The next length of pipe 122 to be welded to the pipeline is positioned with one end 124 thereof adjacent to the end 126 of the pipe 120 with the operator or handle 20 of the apparatus 10 extending therethrough as illustrated in FIG. 1.

The operator 20 is maintained in a position which causes the linkage 24 to close the valve 21 when the apparatus 10 is being moved or otherwise not being used. When the valve 21 is closed the compressed air stored in tank 16 and communicated with the valve 21 by the hose 26 is prevented from passing into the hose assembly 28 to the drive motors 56 and 58, and the hose assembly 28 and drive motors 56 and 58 are opened to the atmosphere through an exhaust port in the valve 21 (not shown). As shown best in FIG. 3 the hose assembly 28 comprises a length of hose 29 having one end attached to valve 21 and the other end attached to a conventional three-way fitting 31. A length of hose 33 is connected to the fitting 31 and to the drive motor 56. A length of hose 35 is connected to the fitting 31 and passes through a bore disposed in the housing 30. The hose 35 is attached to the drive motor 58. Thus, compressed air passing into the hose 29 is conducted by the hoses 33 and 35 to the drive motors 56 and 58.

The drive motors 56 and 58 are of a type such that when the source of compressed air is applied thereto through the hoses 33 and 35, the shafts 60 and 62 thereof will each rotate in a counterclockwise direction when viewed from the end opposite the drive motor. When the source of compressed air is exhausted from the drive motors 56 and 58 the shafts 60 and 62 will rotate in a clockwise direction. Thus, it will be understood that when the valve 21 is closed by the handle 20 the drive wheels 40 and 42 will be in a position such that the shaft members 80 and 84 are not extended and the shoe assemblies 102 are positioned adjacent to the sides of the housing 30 as shown in FIGS. 3 and 4.

As will be further understood, the size of the apparatus 10 is such that for a particular size of pipe, the shoe assemblies 102 thereof will be positioned a predetermined distance away from the inside surfaces of the walls of the pipe. However, when the drive wheels 40 and 42 are rotated so that the shaft members 80 and 84 are extended, the shoe assemblies 102 will contact the inside surfaces of the pipe, as illustrated in FIGS. 2, 3 and 6.

The apparatus 10 is moved to a position within the pipes 120 and 122 by pulling on the handle 20 so that the shoe assemblies 102 attached to the shaft members 80 are positioned just inside the end 124 of the pipe length 122, and the shoes 102 attached to the shaft members 84 are positioned just inside the end 126 of the pipe 120. The handle 20 is then rotated to cause the valve 21 to open thereby communicating the source of compressed air contained within the tank 16 to the drive motors 56 and 58 through the hose 26 and the hose assembly 28. The drive motors 56 and 58 rotate the drive wheels 40 and 42 in opposite directions thereby extending the shaft members 80 and 84 outwardly to a position whereby the shoe assemblies 102 contact the inside surfaces of the pipes 120 and 122.

The slots 74 in the drive wheels 40 and 42, previously described, are positioned such that the drive wheels 40 and 42 will rotate in opposite directions the same distance thereby causing the shoe assemblies 102 to be extended an equal predetermined distance from the sides of the housing 30. Thus, the shoe assemblies 102 contact the inside surfaces of the ends 124 and 126 of the pipes 122 and 120 thereby rigidly securing them in an aligned position. Once aligned, the pipes 120 and 122 may be welded together. After welding, the handle 20 may be rotated to cause the valve 21 to be closed and the compressed air exhausted from the hose assembly 28 and drive motors 56 and 58. The shoe assemblies 102 are moved inwardly toward the housing 30 and away from the inside surfaces of the pipes 120 and 122. The apparatus 10 may then be moved forward through the pipe length 122 by pulling on the handle 20 and the operation repeated to facilitate the welding of another pipe length to the end of the pipe 122.

When compressed air is supplied to the drive motors 56 and 58 thereby causing the drive wheels 40 and 42 to be rotated, the shoe assemblies 102 will be moved outwardly from the sides of the housing 30 into contact with the pipe walls. However, as the shoe assemblies 102 are moved outwardly they are also moved in clockwise or counterclockwise directions. That is, when viewed from the forward end 13 of the apparatus 10, the shoe assemblies 102 attached to the shaft members 80 are all moved in a counterclockwise direction as they are moved outwardly from the sides of the housing 30. The shoe assemblies 102 attached to the shaft members 84 are all moved clockwise as they are moved outwardly from the sides of the housing 30. Thus, the shoe assemblies 102 will initially contact the walls of a pipe and then move a further distance in planes perpendicular to the axis of the housing 30. In order to prevent scratching or otherwise damaging the inside surfaces of the pipe lengths being aligned due to sliding of the shoe assemblies 102 along the pipe walls, the contact members 112 thereof are slidably attached to the blocks 104. Upon mutual contact with the pipe walls, contact members 112 slide along the flange members 108 in directions opposite from the direction of movement of the blocks 104 to the position illustrated in FIG. 6. When the shoe assemblies 102 are retracted from contact with the pipe walls, the contact members 112 will slide back to their original position as shown in FIGS. 4 and 5. Thus, once the contact members 112 initially contact the pipe walls, they remain in a stationary position thereby preventing the pipe walls from being scratched or otherwise damaged. Since the lengths of pipe used in pipelines are often coated with a plastic or other material to prevent corrosion, the prevention of scratching or damaging the coating is very desirable. In order to insure that the contact members 112 remain in the position shown in FIGS. 4 and 5 when the shoe assemblies 102 are retracted, a pair of springs (not shown) may be disposed within the block 104 and attached to the contact members 112 so that they are constantly urged to the desired position.

As will be understood, the shoe assemblies 102 attached to the shaft members 80 and the shoe assemblies 102 attached to the shaft members 84 move in opposite directions in planes perpendicular to the axis of the housing 30 as they move outwardly from the sides of the housing 30. Thus, there is no tendency for the apparatus 10 to rotate about its axis as the shoe assemblies 102 come into contact with the inside surfaces of the pipe walls since the turning moment generated by the shoe assemblies 102 attached to the shaft members 84 is offset by the turning moment generated by the shoe assemblies attached to the shaft member 80.

In aligning the ends of lengths of pipe having slightly different internal diameters, the apparatus 10 is used in the same manner as described above. The shoe assemblies 102 contacting the inside surfaces of the pipe of smaller diameter will move outwardly thereagainst until a force is exerted equal to the force output of the drive motor 56 or 58 connected thereto. The drive motors 56 and 58 are of a predetermined force output such that substantial deformation of the pipe will not result. Further, because the shoe assemblies 102 move in directions generally parallel to the inside surfaces of the pipe as they are moved outwardly thereagainst, any deformation that does result will be uniform and the end of the smaller pipe will not be forced into an out of round shape. Also, the pipe of smaller diameter will always be positioned with the axis thereof coinciding with the axis of the larger diameter pipe since the shoe assemblies 102 contacting the smaller pipe will all move outwardly an identical distance.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of the parts can be made which will readily suggest themselves to those skilled in the art and which are encompassed within the spirit of the invention and the scope of the appended claims.

What is claimed is:

1. Apparatus for aligning the ends of adjoining lengths of pipe comprising:
    a closed cylindrical housing having parallel ends;
    a pair of circular drive wheels rotatably journaled within said housing positioned parallel to and concentrically with the ends of said housing;
    a plurality of elongated shaft members pivotally attached to each of said drive wheels in spaced relation around the peripheries thereof, said shaft members each having one end extending outwardly from the sides of the housing and being slidably secured therein so that rotation of the drive wheels causes the shaft members to be moved inwardly or outwardly with respect to the sides of said housing;
    each of said shaft members having a shoe assembly for contacting the inside surface of a pipe attached to the outer end thereof;
    means for rotating the drive wheels in predetermined directions attached to said housing;
    and means for movably supporting said housing within a pipe attached to said housing.

2. Apparatus for aligning the ends of adjoining lengths of pipe comprising:
    a closed cylindrical housing having parallel ends;
    a pair of circular drive wheels rotatably journaled within said housing positioned parallel to and concentrically with the ends of said housing;
    a plurality of elongated shaft members pivotally attached to each of said drive wheels in space relation around the peripheries thereof, said shaft members each having one end extending outwardly from the sides of the housing and being slidably secured therein so that rotation of the drive wheels causes the shaft members to be moved inwardly and outwardly with respect to the sides of said housing;
    each of said shaft members having a shoe assembly for contacting the inside surface of a pipe attached to the outer end thereof;
    a pair of pneumatically operated drive motors attached to the opposite ends of said housing for rotating the drive wheels in predetermined directions, each of said motors having the drive shaft thereof attached to one of the said drive wheels;

a source of compressed air;

conduit means connecting the source of compressed air to said drive motor;

a valve disposed within said conduit means for controlling the flow of compressed air therethrough attached to the forward end of said housing;

means for selectively opening or closing said valve from outside said lengths of pipe attached to said valve;

and means for movably supporting said housing within a pipe attached to said housing.

3. The apparatus of claim 2 wherein each of said shoe assemblies comprises:

a rectangular clock pivotally attached to said shaft member, said block including upstanding flanges running along the outer surface thereof positioned in a plane perpendicular to the axis of said housing;

a pair of pipe wall contact members slidably attached to said pair of upstanding flanges so that upon initial contact with the inside surface of said pipe, said pipe wall contact members remain stationary with respect thereto.

4. The apparatus of claim 3 wherein each of said shoe assemblies is further characterized to include resilient means attached to said block and to said wall contact members for constantly urging said contact members to a desired position on said upstanding flanges.

5. The apparatus of claim 4 wherein said means for movably supporting said housing within a pipe comprises:

a frame attached to the rearward end of said housing; and a plurality of wheels for movably supporting said frame in said pipe rotatably attached to said frame.

6. The apparatus of claim 5 wherein said source of compressed air is a tank attached to said frame having a supply of compressed air contained therein.

* * * * *